(12) United States Patent
Rotenberg

(10) Patent No.: US 11,104,189 B2
(45) Date of Patent: Aug. 31, 2021

(54) INDEXING CHANGEOVER MECHANISM FOR USE WITH A PLURALITY OF INTEGRATED TOWING ACCESSORIES

(71) Applicant: HORIZON GLOBAL AMERICAS INC., Plymouth, MI (US)

(72) Inventor: Gregory Y. Rotenberg, Highland Heights, OH (US)

(73) Assignee: HORIZON GLOBAL AMERICAS INC., Plymouth, MI (US)

( * ) Notice: Subject to any disclaimer, the term of this patent is extended or adjusted under 35 U.S.C. 154(b) by 323 days.

(21) Appl. No.: 16/381,396

(22) Filed: Apr. 11, 2019

(65) Prior Publication Data

US 2019/0315168 A1   Oct. 17, 2019

Related U.S. Application Data

(60) Provisional application No. 62/655,847, filed on Apr. 11, 2018.

(51) Int. Cl.
*B60D 1/07* (2006.01)
*B60D 1/52* (2006.01)
*B60D 1/06* (2006.01)

(52) U.S. Cl.
CPC ............. *B60D 1/07* (2013.01); *B60D 1/52* (2013.01); *B60D 1/06* (2013.01)

(58) Field of Classification Search
CPC ............. B60D 1/07; B60D 1/52; B60D 1/075
USPC ........................................ 280/416.2
See application file for complete search history.

(56) References Cited

U.S. PATENT DOCUMENTS

| 3,804,437 | A | * | 4/1974 | McCabe | B60D 1/07 280/489 |
|---|---|---|---|---|---|
| 5,741,022 | A | * | 4/1998 | Wass | B60D 1/06 280/507 |
| 6,824,156 | B2 | | 11/2004 | Smith | |
| 6,974,148 | B2 | | 12/2005 | Moss | |
| 7,004,492 | B2 | | 2/2006 | Moss | |
| 7,029,022 | B2 | | 4/2006 | Moss | |
| 7,862,066 | B2 | | 1/2011 | Smith | |
| 8,366,133 | B2 | * | 2/2013 | Brinkley | B60D 1/07 280/416.1 |
| D729,703 | S | | 5/2015 | Song | |
| 9,457,631 | B1 | * | 10/2016 | Kennemer | B60D 1/46 |
| 10,336,145 | B1 | * | 7/2019 | Dunn | B60D 1/363 |
| 10,391,825 | B2 | * | 8/2019 | Cincunegui | B60D 1/065 |
| 2001/0045725 | A1 | * | 11/2001 | McCoy | B60D 1/06 280/511 |
| 2018/0079266 | A1 | * | 3/2018 | Cincunegui | B60D 1/06 |

(Continued)

*Primary Examiner* — Minnah L Seoh
*Assistant Examiner* — Sophia Marie McGuire
(74) *Attorney, Agent, or Firm* — McDonald Hopkins LLC

(57) ABSTRACT

An indexing block positioned within the receiver hitch and connected to a tri-ball block having a plurality of towing accessories (e.g., different sized hitch balls, pintles, hooks, etc.) on its separate, exterior facings. A biasing member and lock cooperate with an internal, coaxial plunger, thereby allowing for selective rotation of the tri-block relative to the indexing block, without the need to completely remove the assembly from the hitch receiver itself. Ball bearings fitted within the indexing block facilitate movement of the plunger and tri-block relative to the indexing block when the assembly is being rotated to position a new towing accessory in its desired place.

21 Claims, 6 Drawing Sheets

(56) References Cited

U.S. PATENT DOCUMENTS

2019/0275850 A1\* 9/2019 Pucheu ................... B60D 1/52
2021/0101428 A1\* 4/2021 Bowles ..................... B60R 9/06

\* cited by examiner

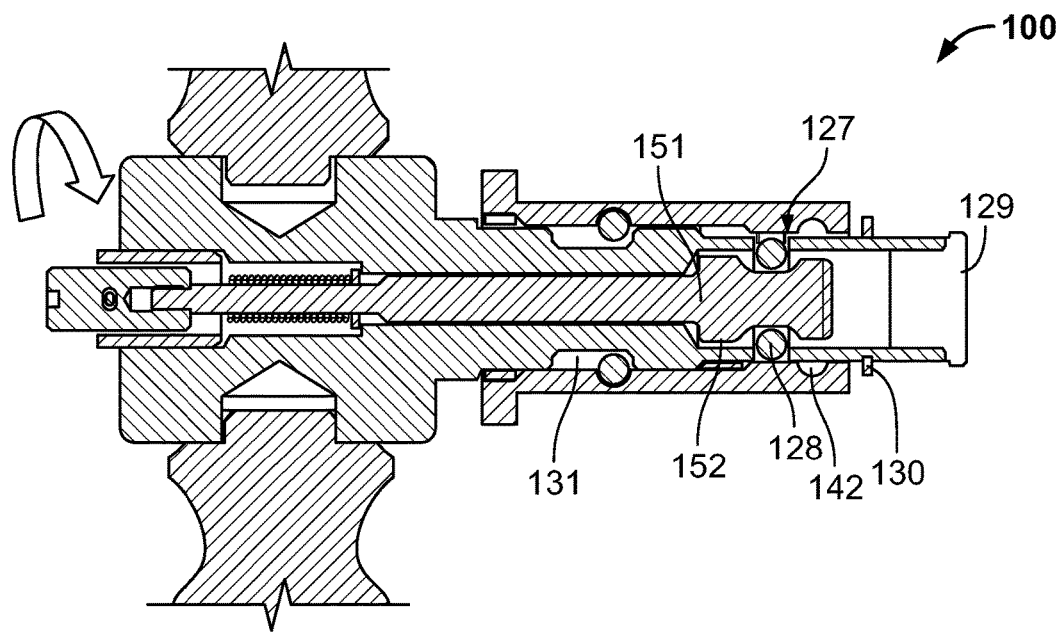
FIG. 6
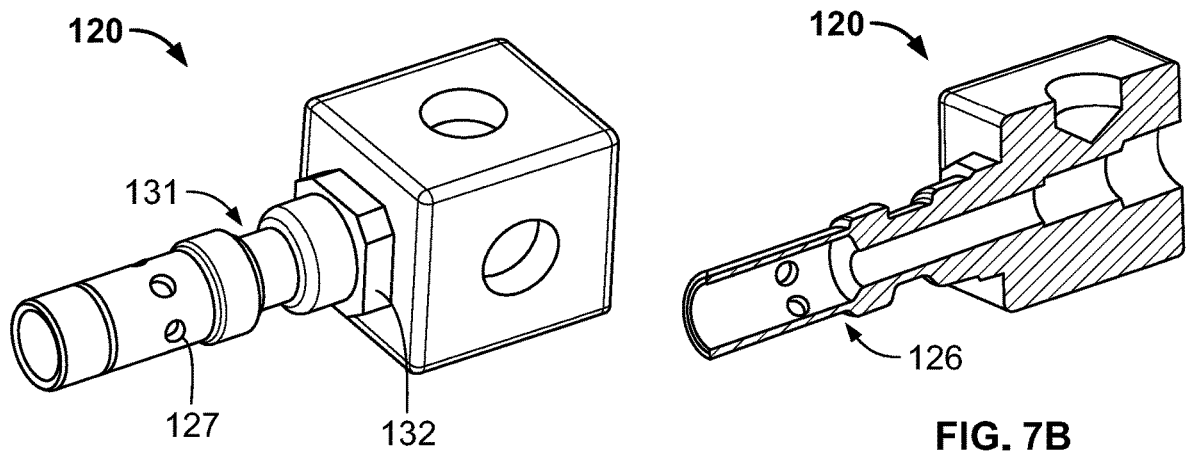
FIG. 7A  FIG. 7B

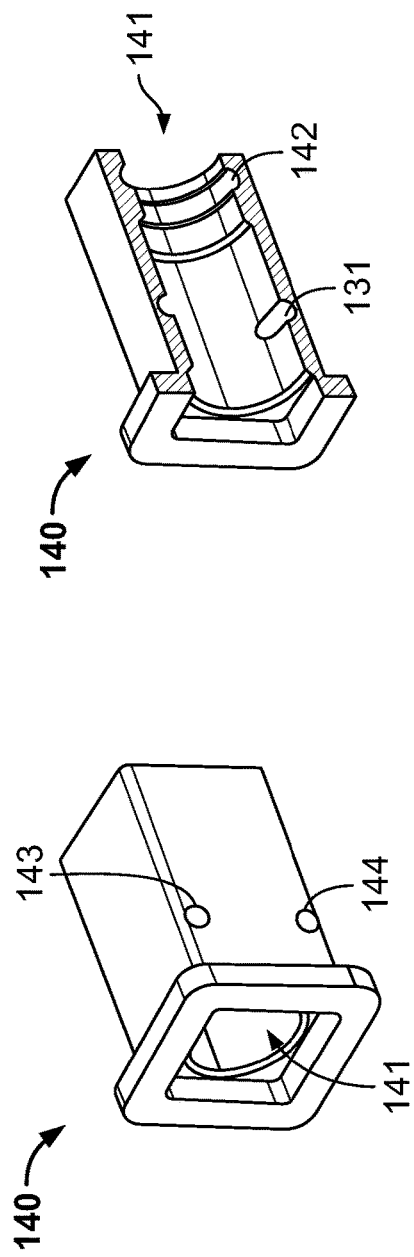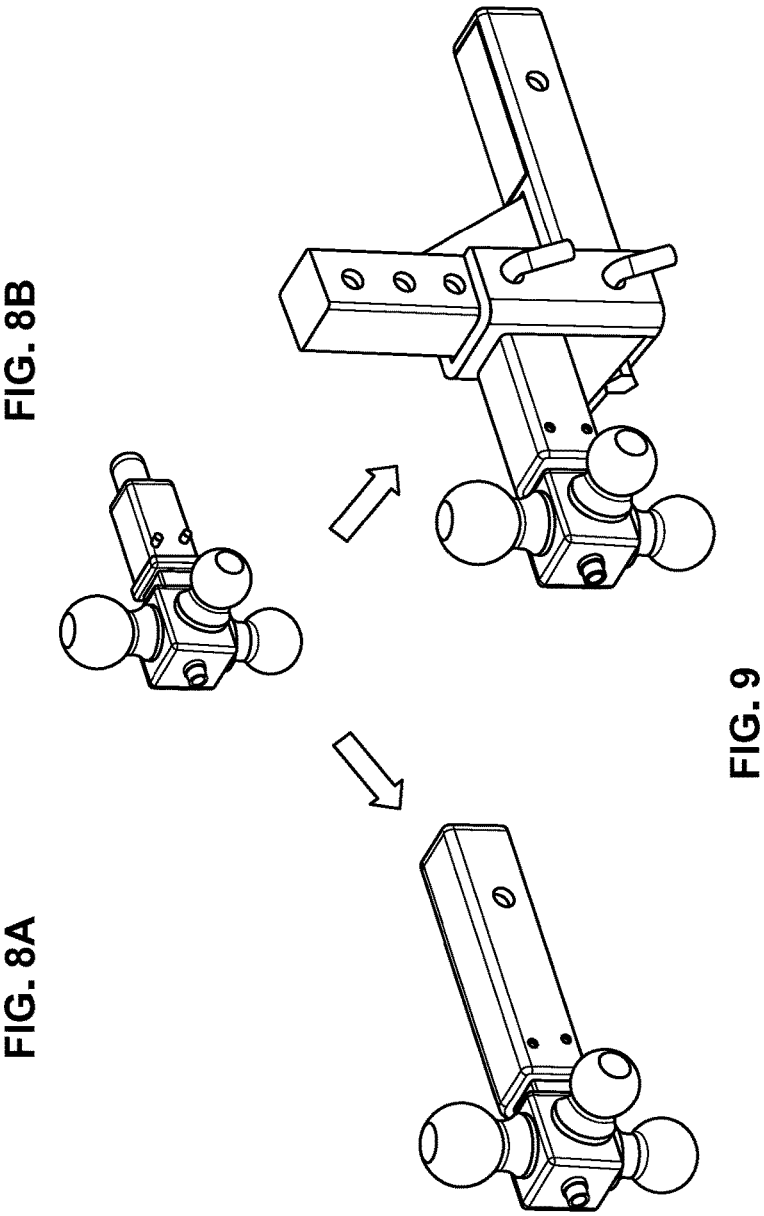

INDEXING CHANGEOVER MECHANISM FOR USE WITH A PLURALITY OF INTEGRATED TOWING ACCESSORIES

CROSS-REFERENCE TO RELATED APPLICATIONS

This application claims priority to and the benefit from U.S. Provisional Patent Application No. 62/655,847 filed on Apr. 11, 2018 and titled: "INDEXING CHANGEOVER MECHANISM FOR USE WITH A PLURALITY OF INTEGRATED TOWING ACCESSORIES," the contents of which are incorporated by reference in its entirety.

TECHNICAL FIELD

The present disclosure relates generally to towing apparatus and, more specifically, to a mechanism mounted within a standard hitch box receiver that allows for the quick alteration of a plurality of towing apparatus integrated onto the mechanism itself.

BACKGROUND

Hitch balls are an essential part of many towing operations. The use of hitch balls allows for easy coupling, wide angles of rotation, and a secure fit in the coupling itself. However, a variety of couplers exists, often requiring the use of hitch ball of differing sizes (e.g., 2 inch, 3 inch, etc.). As a result, users may need to possess a variety of different hitch balls of varying sizes, which can be inconvenient to store and, owing to the plurality of separate parts, relatively easy to misplace. For example, different sized balls may be needed to account for the size of the mating coupler and/or the capacity of the entire system utilized to tow.

In order to minimize the number of disparate parts, dual and tri-ball mounts are known. For example, U.S. Pat. D729,703 discloses an ornamental design for a tri-ball mount as shown in FIG. 1A. Other approaches involve providing a rotating and/or pivoting mount, as seen in U.S. Pat. Nos. 8,366,133; 7,862,066; 7,029,022; 7,004,492; and/ or 6,974,148, with FIG. 1B showing an exploded view taken from U.S. Pat. No. 7,862,066. In all instances, the mechanism for selecting a new hitch or other towing accessory requires removing the square-fitted mount from the hitch receiver.

SUMMARY

Provided is a towing apparatus having a plurality of interchangeable towing accessories, the apparatus comprising a multi-face block having a distal body member defining a plurality of separate facings. A proximally extending engagement shaft having a plurality of through holes, an annular groove on an outer facing surface, and a shoulder member having a non-circular shape attaching the shaft to the distal body. A locking assembly positioned in the distal body and a plunger coaxially fitted within the engagement shaft and connecting to the locking assembly. An indexing block having a central interior channel with an annular groove formed on the inner surface of the channel, wherein the engagement shaft is received within and is configured to translate and rotate within the channel. At least one ball bearing positioned between the multi-face block and the indexing block wherein the multi-face block is configured to be placed in a locked position and an unlocked position relative to indexing block to allow a selected towing accessory to be positioned in a use position. The plunger may include an annular indent in communication with at least one of the ball bearings and at least one through hole positioned along the elongated shaft. In the locked position, the at least one ball bearing may be moved into abutting engagement with the groove of the indexing block. In the unlocked position, the at least one ball bearing may be moved out of abutting engagement with the groove and positioned within the indent of the plunger. The elongated shaft includes a shoulder having a non-circular cross section configured to be selectively received within a receiver portion on the indexing block, wherein the multi-face block is prevented from rotating relative to the indexing block when the shoulder is positioned within the receiver portion. The engagement shaft further comprises at least one stopping tab to prevent the multi-face block from being removed from the indexing block. The engagement shaft further comprises a proximal cap. The locking assembly includes a locking tab, an insert, and a biasing member wherein the biasing member provides a bias force in a distal direction relative to the multi-face block. The locking assembly may be attached to the plunger. The indexing block includes at least one transverse hole for selectively receiving a dowel wherein the dowel is configured to be positioned within an annular groove of the engagement shaft of the multi-face block. A distal opening of the channel includes a transverse cross sectional shape that cooperates with the transverse cross sectional shape of the shaft where the shaft attaches to the distal body.

In another embodiment, provided is a quick changeover mechanism comprising a rotating multi-face block assembly that includes a main body having a plurality of surface for supporting towing accessories and engagement shaft extending from the main body. An indexing block attachable to a hitch receiver. A biasing member and lock cooperate with a coaxial plunger, thereby allowing for selective rotation of the multi-face block relative to the indexing block, without the need to completely remove the assembly from the hitch receiver. The at least one ball bearing may be fitted within the indexing block to facilitate movement of the plunger and multi-face block relative to the indexing block when the assembly is being rotated to position a towing accessory in a desired place. The towing accessories include different sized hitch balls, pintles, or hooks. Each of the towing accessories may be positioned on a separate, exterior face of the multi-face block. The multi-face block may comprise two, three, four, five, six or more exterior faces.

In a locked position, at least one ball bearing may be moved into abutting engagement with a groove of the indexing block. In the unlocked position, the at least one ball bearing may be moved out of abutting engagement with the groove and positioned within an indent of the plunger. The engagement shaft includes a shoulder having a non-circular cross section configured to be selectively received within a receiver portion on the indexing block wherein the multi-face block is prevented from rotating relative to the indexing block when the shoulder is positioned within the receiver portion.

In an embodiment, provided is a method of providing a plurality of towing accessories for a vehicle without the need to completely remove a towing assembly from a hitch receiver comprising a rotating assembly that includes a multi-face block having a plurality of towing accessories and an engagement shaft extending axially from the multi-face block. The engagement shaft of the multi-face block is inserted into a channel of an indexing block and the indexing block may be selectively attached to a hitch receiver of a vehicle. The rotating assembly includes a lock assembly having a bias member configured to cooperate with a coaxial plunger, thereby allowing for selective rotation of the multi-face block relative to the indexing block. The engagement shaft of the multi-face block includes at least one ball bearing that cooperates with the plunger, and a groove along an inner surface of the indexing block to facilitate movement of the plunger and multi-face block relative to the indexing block when the assembly is being rotated to position a new towing accessory in a desired place.

Further, the rotating assembly may be selectively placed in a locked position to prevent translational movement between the multi-face block and the indexing block, wherein at least one ball bearing is moved into abutting engagement with a groove of the indexing block. The rotating assembly may be selectively placed in an unlocked position to allow translational movement between the multi-face block and the indexing block, wherein the at least one ball bearing is positioned within an indent of the plunger. The rotating assembly may be selectively placed in a locked position to prevent rotational movement between the multi-face block and the indexing block, wherein a shoulder having a non-circular cross section is positioned within a receiver portion on the indexing block. The rotating assembly may be selectively placed in an unlocked position to allow rotational movement between the multi-face block and the indexing block, wherein said shoulder is translated from the receiver portion of the indexing block.

Specific reference is made to the appended claims, drawings, and description below, all of which disclose elements of the disclosure. While specific embodiments are identified, it will be understood that elements from one described aspect may be combined with those from a separately identified aspect. In the same manner, a person of ordinary skill will have the requisite understanding of common processes, components, and methods, and this description is intended to encompass and disclose such common aspects even if they are not expressly identified herein.

DESCRIPTION OF THE DRAWINGS

Operation of the disclosure may be better understood by reference to the detailed description taken in connection with the following illustrations. These appended drawings form part of this specification, and any written information in the drawings should be treated as part of this disclosure. In the same manner, the relative positioning and relationship of the components as shown in these drawings, as well as their function, shape, dimensions, and appearance, may all further inform certain aspects of the disclosure as if fully rewritten herein.

In the drawings:

FIG. 6 is a cross sectional view illustrating the sequence of movements for unlocking and rotating the multi-face block when a push button is in its unlocked position;

FIG. 7A illustrates a sectional perspective view of the multi-face block component;

FIG. 7B illustrates a cut-away sectional perspective view of the multi-face block component;

FIG. 8A illustrates a sectional perspective view of an indexing block component;

FIG. 8B illustrates a cut-away sectional perspective view of the indexing block component;

FIG. 9 is a perspective view of embodiments of the towing apparatus that indicates how it may be applied in a modular fashion to standard hitch receivers and/or adjustable elevation assemblies.

DETAILED DESCRIPTION

Reference will now be made in detail to exemplary embodiments of the present disclosure, examples of which are illustrated in the accompanying drawings. It is to be understood that other embodiments may be utilized and structural and functional changes may be made without departing from the respective scope of the disclosure. As such, the following description is presented by way of illustration only and should not limit in any way the various alternatives and modifications that may be made to the illustrated embodiments and still be within the spirit and scope of the disclosure.

As used herein, the words "example" and "exemplary" mean an instance, or illustration. The words "example" or "exemplary" do not indicate a key or preferred aspect or embodiment. The word "or" is intended to be inclusive rather an exclusive, unless context suggests otherwise. As an example, the phrase "A employs B or C," includes any inclusive permutation (e.g., A employs B; A employs C; or A employs both B and C). As another matter, the articles "a" and "an" are generally intended to mean "one or more" unless context suggest otherwise.

The disclosed assemblies described herein address the foregoing shortcomings of previously known devices having a plurality of integrated towing accessories (e.g., different sized hitch balls, etc.). In particular, the inconvenience of removing, rotating/repositioning, and re-securing a multi-ball hitch mount mechanism or the like is eliminated. In its place, an integrated, lockable assembly secures the selected accessory on the mount in position, with an indexing mechanism allowing rotation of the mount at pre-selected angles (preferably about 90° increments, i.e., within about 5° of 90°) without the need for additional tools or removal of the assembly from the hitch receiver.

Figure 1A:
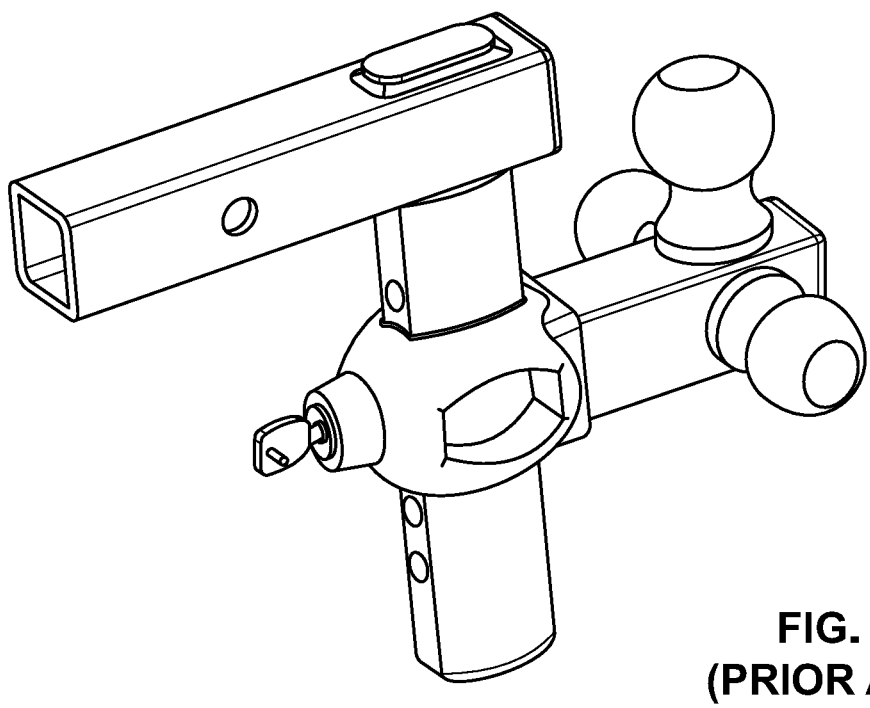
FIG. 1A is a perspective view that discloses an ornamental design for a tri-ball mount as depicted in U.S. Pat. D729, 703.
Figure 1B:
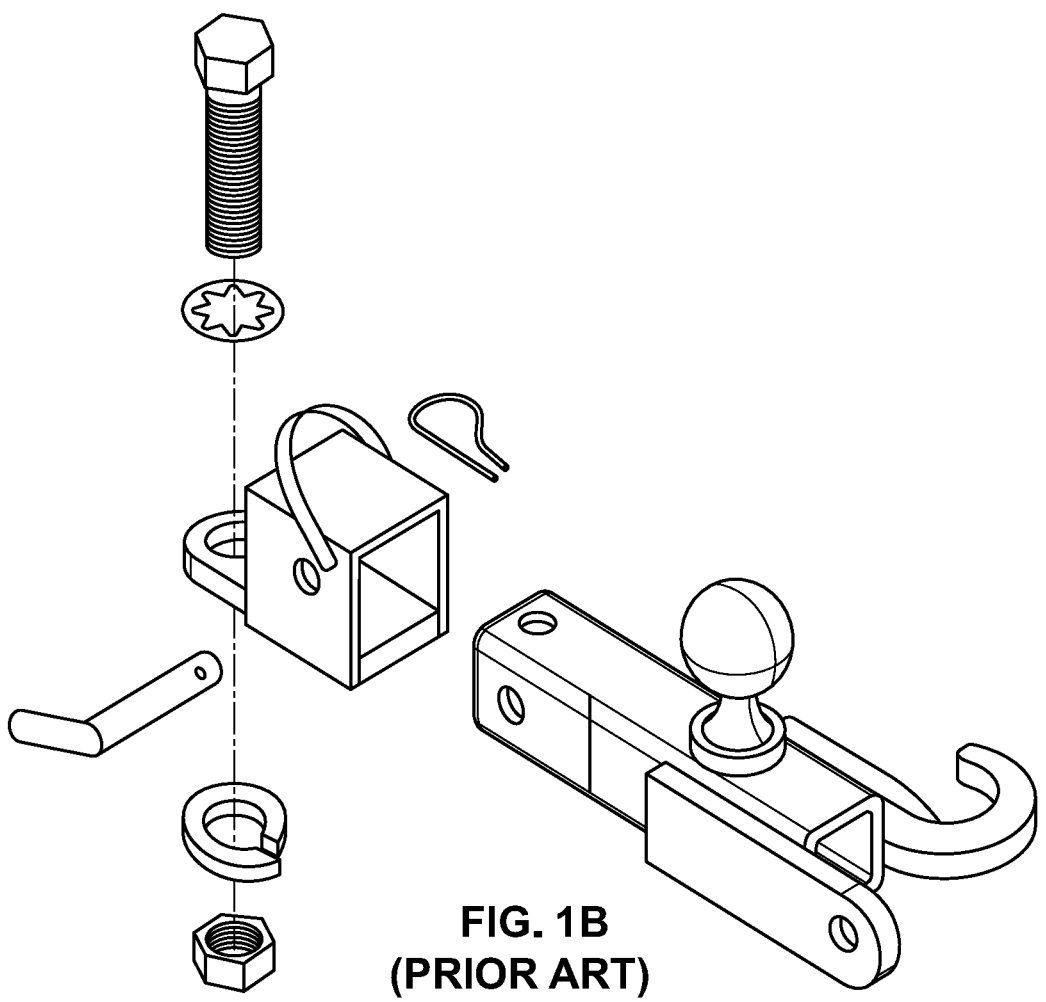
FIG. 1B is an exploded view of a prior art fully removable multi-accessory assembly as depicted in U.S. Pat. No. 7,862,066.
Figure 2:
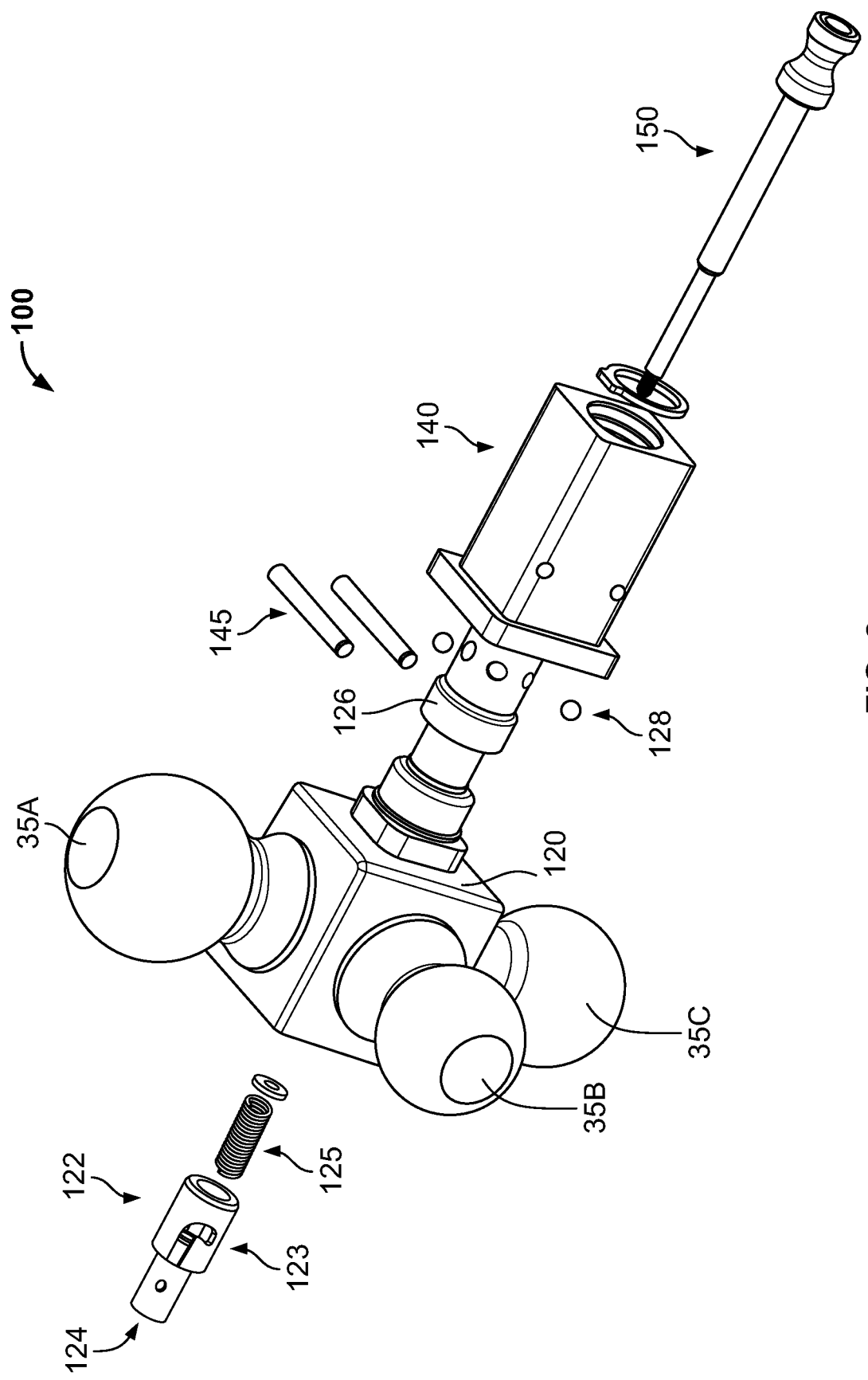
FIG. 2 is an exploded perspective view of an embodiment of the towing apparatus of the present disclosure.
Figure 3B:
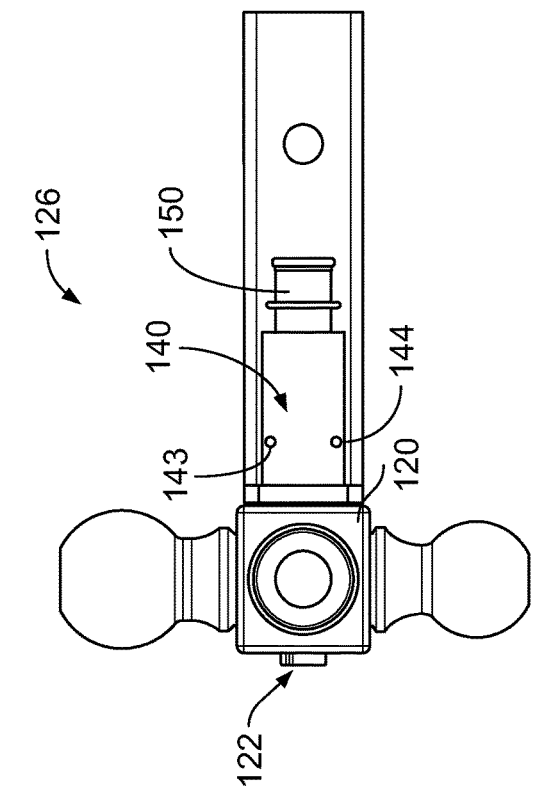
FIG. 3B is a cross sectional view of the towing apparatus of the present disclosure positioned within a receiver hitch.
Figure 4B:
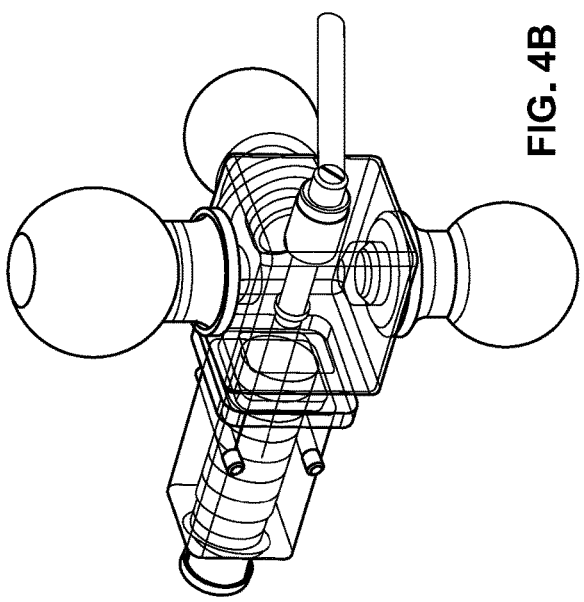
FIG. 4B is a perspective view taken from an orthogonal angle, relative to FIG. 3A, showing components in partial, transparent orientation.
Figure 3A:
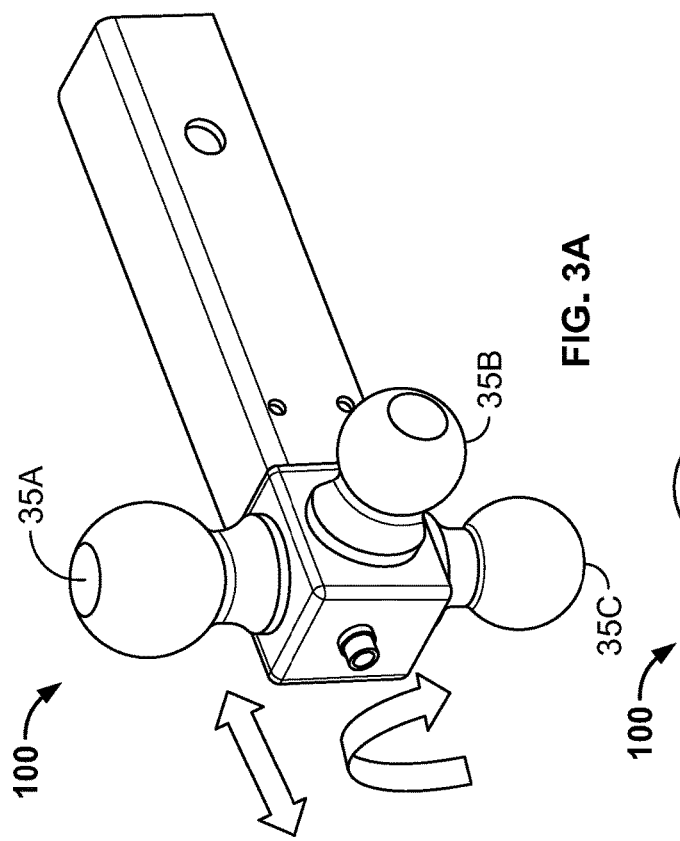
FIG. 3A is a perspective view indicating rotation and movement of the towing apparatus of the present disclosure positioned within a receiver hitch.
Figure 4A:
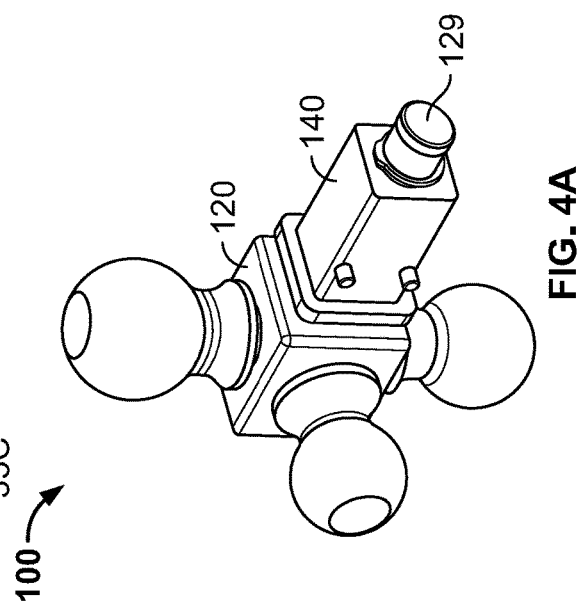
FIG. 4A is a reverse perspective view, relative to that of FIG. 3A, in which the towing apparatus is removed from the receiver hitch.
Figure 5:
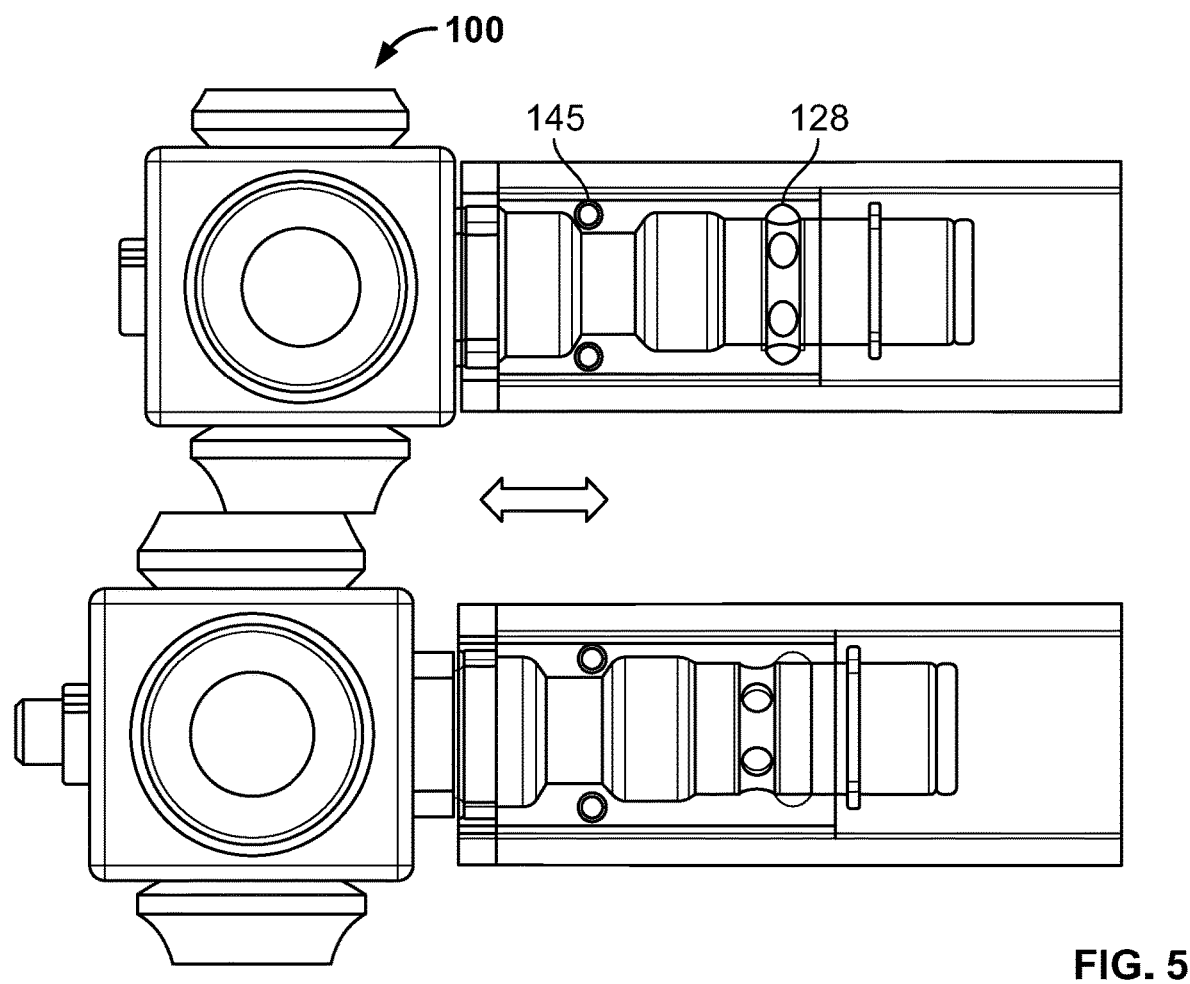
FIG. 5 shows cross sectional views of an embodiment of the towing apparatus with partial, transparent illustration of interior components demonstrating how the plunger and ball bearings cooperate when a multi-face block is extended into a rotating position.

With reference to FIGS. 2 through 9, a towing apparatus, which may be referred to as a quick changeover assembly 100 includes multi-face block 120 and an indexing block 140. An end of the indexing block 140 of the quick changeover assembly 100 may be selectively received by a hitch receiver 30 or other similar attachment mechanism, which is normally affixed to the towing vehicle itself (not shown). As one example, the hitch receiver 30 may comprise a standard, 2 inch receiver hitch tube. Indexing block 140 may be at least partially nested within hitch receiver 30 while multi-face block 120 remains exposed or at least partially exposed so as to allow for access to the towing accessories 35a, 35b, 35c affixed thereto.

While towing accessories 35a, 35b, 35c are generally shown as hitch balls of differing sizes, it will be understood that a variety of different apparatus may be integrated with the multi-face block 120, including lunette rings, pintle hooks, couplers, steps, hooks, recovery rings and other common towing or hitch accessories. Similarly, the term multi-face block should not be considered as limited to only three accessories. In some embodiments, only two accessories may be positioned opposite or orthogonal to one another. In other embodiments, the block may have four or more facings (e.g., 4, 5, 6, 7, etc.), thereby allowing even more accessories to be affixed thereto.

Towing accessories 35a, 35b, 35c may be integrally formed or affixed to separate, exterior facings of the multi-face block 120. In this manner, the accessories 35a, 35b, 35c remain accessible and usable when the assembly 100 is affixed to a hitch receiver 30. In normal use, the accessory positioned on an exterior facing and directed up relative to the road surface will be in the preferred position for use, but in other embodiments, any of the accessory positions may comprise an operative position.

A lock assembly 122 may be fitted in a distal end of multi-face block 120. Lock assembly 122 may comprise a bayonet insert 123 having a guide/locking groove that cooperates with push button 124. A biasing member 125, such as a compression spring and washer, urges the push button 124 outward when the button is rotated to its open position. In this manner, the user will know when the lock assembly is released or unlocked, thereby allowing for rotation of the multi-face block 120 as described herein. When the locking assembly is locked, the push button 124 is depressed relative to the insert 123 and multi-face block 120, and the assembly 100 remains fixed in place so as to allow for engagement and use of the towing accessories.

At the opposite end of the multi-face block 120 from the lock assembly 122, an engagement shaft 126 protrudes proximally into a hollowed out portion of indexing block 140. Engagement shaft 126 may be fixed to or integrally formed on the multi-face block 120. Engagement shaft 126 comprises an elongated body that may be shaped as a rounded cylinder of varying diameter profiles along its length. The profile may form a series of shoulders and/or grooves at different points along its longitudinal axis of the engagement shaft 126. At a desired position along the engagement shaft 126, a series of through holes 127 receive ball bearings 128. Ball bearings 128 may be aligned to rest within corresponding annular grooves 142 formed on an interior surface of the indexing block 140, as will be described below, to facilitate the rotation and/or locking of the multi-face block 120 relative to the indexing block 140. Thus, the holes 127, ball bearings 128, and groove 142 may all have similar or cooperating dimensions.

In some aspects, elongated shaft 126 has shoulders 132 forming a non-circular cross section at or proximate to the distal end where the shaft 126 attaches to the multi-face block 120. The shoulders 132 may be configured to rest within a receiver portion which is a corresponding feature at the distal end of the channel 141 (FIG. 8A) on the indexing block 140 to prevent rotation when the multi-face block 120 abuts or interfaces with indexing block 140.

The indexing block 140 may include the channel 141 formed along an axis in its interior. Engagement shaft 126 may fit with channel 141, with stopping tabs 130 formed or affixed on at least a portion of the exterior facing of the shaft 126. Tabs 130 may assist in preventing the multi-face block 120 from being pulled or translating distally a predetermined dimension relative to the indexing block 140. Channel 141 includes at least one circumferential groove 142 sized to cooperate with portions of the multi-face block 120 assembly, as described below.

Top and bottom pin holes 143, 144 may transversely penetrate the indexing block 140. The pin holes 143, 144 may be positioned so that a portion of one or both pin holes 143, 144 opens and communicates with the interior void created by the interior channel 141. Pin holes 143, 144 may be sized to receive attachment dowels or pins 145, which may be of similar or corresponding size and construction to standard pin and clip assemblies commonly used to attach towing apparatus to a receiving hitch.

The engagement shaft 126 may coaxially receive a plunger 150. Plunger 150 may effectively pass through and move within the multi-face block 120 and the engagement shaft 130, as well as being at least partially received and contained within the channel 141 of indexing block 140. A cap 129 at the proximal end of shaft 126 may conceal the plunger 150 within the multi-face block 120. The plunger 150 may include a main body 151 formed at or near the proximal end. In some aspects, the main body 151 may taper down along a series of shoulders so as to be received by the engagement shaft 126. An indent 152 may be positioned along the outer facing circumference of the main body 151. The indent 152 may be an annular recess configured to interact with bearings 128 and through holes 127.

The plunger 150 may be attached to the locking assembly 122 at its distal end. In some aspects, the biasing member 125 may urge the locking assembly 122 outward in the unlocked position, thereby moving the plunger 150 in a similar distal direction (i.e., away from the indexing block 140 and vehicle). In doing so, the indent 152 may be positioned in alignment with through holes 127 so that the bearings 128 may be moved out of abutting engagement with the groove 141. Here, the bearings 128 may be received within the indent 152, allowing the engagement shaft 130 to translate relative to the index block 140.

When in the locked position, the plunger 150 may be translated inward/proximally relative to the engagement shaft 130 so that the indent 152 is placed out of alignment with the through holes 127, causing the ball bearings 128 to be forced through the holes 127 by the sloping nature of the indent 152. Ultimately, the balls 128 may nest in abutting engagement within the groove 141 along the inner surface of the indexing block 140, thereby locking and preventing translational movement of the engagement shaft 126 (and by extension, the multi-face block 120) relative to the indexing block 140. Locking assembly 122 may further ensure that unwanted movement of the shaft 126 relative to the indexing block 140 is eliminated. Notably, the interaction between the ball bearings 128, through holes 127, indent 152 and groove 141 may allow for the multi-face block 120 and engagement shaft 130 to restrict or allow translational movement relative to the indexing block 140.

In both the locked and unlocked positions, the ball bearings 128 may be at least partially situated within through holes 127. A plurality of holes 127 and ball bearings 128 may be used. Preferably, six bearings are spaced apart evenly along a common exterior circumference, but the present disclosure is not limited to such. In exemplary embodiments, two, three, four, five, seven, eight or more combination of holes 127 and ball bearings 128 may be utilized. Further, while the present disclosure includes the same number of holes 127 as ball bearings 128, the present disclosure is not limited to such; there may be more holes 127 than ball bearings 128.

Dowels 145 may be inserted into through holes 143, 144. Dowels 145 may freely rotate or allow for low friction passage as the shaft 126 is translated or rotated relative to the indexing block 140. The exterior surface of the shaft 126 may have a corresponding annular groove 131 positioned proximate to the holes 143, 144 when the multi-face block 120 and indexing block 140 are assembled. The longitudinal width of groove 131 (i.e., the gap formed by the shoulders of the groove), in combination with dowels 145 may help to limit the distal and proximal translational movements of the shaft 126 relative to the indexing block 140. Groove 131 may substantially circumscribe the exterior of the shaft 126 so as to allow for rotation of the shaft 126 within the channel 141.

In operation, the assembly 100 may be normally locked via locking assembly 122. Preferably, the locking assembly includes a keyed release, so as to prevent inadvertent unlocking.

Once unlocked, the spring 125 urges the push button 124 distally outward. Because the plunger 150 is attached to the assembly 122, it also moves in concert with the button 124 (either by force of the spring 125 alone or in combination with user assistance). As the indent 152 moves coaxially past the through holes 127, the bearings 128 are forced inward into the void provided by the indent 152. The assembly 100 is thereby unlocked.

Additional user intervention (or sufficient force spring 125) may allow the multi-face block assembly to be partially removed from the indexing block 140. Once shoulders 132 are removed from their nested position within the indexing block 140, the multi-face block 120 may be rotated to reposition the desired towing apparatus 35a, 35b, 35c. By providing shoulders with an identical orientation relative to the outer facings of the apparatus 35a, 35b, 35c, the multi-face block 120 can only be moved distally back into a lockable position when the multi-face block 120 is properly aligned and engaged with the indexing block 140. In this manner, the assembly 100 retains proper orientation while simultaneously remaining affixed to the hitch receiver 30.

In one embodiment, the indexing block 140 may be received within the hitch receiver 30 wherein holes 142, 143 and dowels 145 may be aligned with similar holes along the hitch receiver 30 to maintain a structural and selective attachment there between. However, the indexing block may also be formed as a standard hitch receiver to extend from and be compatible with various towing assemblies of the towing vehicle.

Preferably, the assembly 100 is attached to or integrated with a standard sized receiver hitch tube 30, thereby allowing operation of the assembly, and particularly rotation of the shaft 126, to be accomplished more easily. In other embodiments, the assembly may be releasably attachable to such hitch receivers and other common towing apparatus.

All components described herein may be constructed from any variety of metals. Ideally, durable grade alloys and/or stainless steels may be used. Attachment of parts may be made by way of standard fasteners (e.g., screws, nuts, bolts, pins, etc.), adhesives, welding, and/or mating or interlocking flanges, tabs, indents/detents, and the like. In some instances, the parts—and particularly the multi-face block, plunger, and/or indexing block—may be forged, cast, machined, or otherwise formed with the features.

One advantage of the assembly 100 is that it remains constantly coupled to the hitch receiver 30, thereby avoiding the need to remove and reattach anti-rattle devices, locking pins, and the like. As noted above, assembly 100 minimizes the number and need for a separate towing apparatus and, more generally, simplifies user experience with an intuitive, indexing feature that ensures proper alignment of the towing accessories 35a, 35b, 35c.

Although the present embodiments have been illustrated in the accompanying drawings and described in the foregoing detailed description, it is to be understood that the disclosure is not to be limited to just the embodiments disclosed, and numerous rearrangements, modifications and substitutions are also contemplated. The exemplary embodiment has been described with reference to the preferred embodiments, but further modifications and alterations encompass the preceding detailed description. These modifications and alterations also fall within the scope of the appended claims or the equivalents thereof

What is claimed is:

1. A towing apparatus having a plurality of interchangeable towing accessories, the towing apparatus comprising:
    a multi-face block having:
        a distal body member defining a plurality of separate facings;
        a proximally extending engagement shaft having a plurality of through holes, an annular groove on an outer facing surface, and a shoulder member having a non-circular shape attaching the shaft to the distal body;
        a locking assembly positioned in the distal body; and
        a plunger coaxially fitted within the engagement shaft and connecting to the locking assembly;
    an indexing block having a central interior channel with an annular groove formed on the inner surface of the channel, wherein the engagement shaft is received within and is configured to translate and rotate within the channel; and
    at least one ball bearing positioned between the multi-face block and the indexing block;
    wherein the multi-face block is configured to be placed in a locked position and an unlocked position relative to the indexing block to allow a selected towing accessory to be positioned in a use position.

2. The towing apparatus according to claim 1 wherein the plunger has an annular indent in communication with at least one of the ball bearings and at least one through hole positioned along the elongated shaft.

3. The towing apparatus according to claim 2 wherein, in the locked position, the at least one ball bearing is moved into abutting engagement with the groove of the indexing block and, in the unlocked position, the at least one ball bearing is moved out of abutting engagement with the groove and positioned within the indent of the plunger.

4. The towing apparatus according to claim 1 wherein the elongated shaft includes a shoulder having a non-circular cross section configured to be selectively received within a receiver portion on the indexing block wherein the multi-face block is prevented from rotating relative to the indexing block when the shoulder is positioned within the receiver portion.

5. The towing apparatus according to claim 1 wherein the engagement shaft further comprises at least one stopping tab to prevent the multi-face block from being removed from the indexing block.

6. The towing apparatus according to claim 1 wherein the engagement shaft further comprises a proximal cap.

7. The towing apparatus according to claim 1 wherein the locking assembly includes a locking tab, an insert, and a biasing member wherein the biasing member provides a bias force in a distal direction relative to the multi-face block.

8. The towing apparatus according to claim 7 wherein the locking assembly is attached to the plunger.

9. The towing apparatus according to claim 1 wherein the indexing block includes at least one transverse hole for selectively receiving a dowel, and wherein the dowel is configured to be positioned within an annular groove of the engagement shaft of the multi-face block.

10. The towing apparatus according to claim 1 wherein a distal opening of the channel includes a transverse cross sectional shape that cooperates with the transverse cross sectional shape of the shaft where the shaft attaches to the distal body.

11. A quick changeover mechanism comprising:
a rotating multi-face block assembly that includes a main body having a plurality of surface for supporting towing accessories and engagement shaft extending from the main body;
an indexing block attachable to a hitch receiver;
a biasing member and lock cooperate with a coaxial plunger, thereby allowing for selective rotation of the multi-face block relative to the indexing block, without the need to completely remove the assembly from the hitch receiver.

12. The mechanism of claim 11 further comprising at least one ball bearing fitted within the indexing block to facilitate movement of the plunger and multi-face block relative to the indexing block when the assembly is being rotated to position a towing accessory in a desired place.

13. The mechanism of claim 11 wherein the towing accessories include different sized hitch balls, pintles, or hooks.

14. The mechanism of claim 13 wherein each of the towing accessories are positioned on a separate, exterior face of the multi-face block.

15. The mechanism of claim 14 wherein the multi-face block comprises three exterior faces.

16. The mechanism of claim 11 wherein, in a locked position, at least one ball bearing is moved into abutting engagement with a groove of the indexing block and, in the unlocked position, the at least one ball bearing is moved out of abutting engagement with the groove and positioned within an indent of the plunger.

17. The towing apparatus according to claim 11 wherein the engagement shaft includes a shoulder having a non-circular cross section configured to be selectively received within a receiver portion on the indexing block wherein the multi-face block is prevented from rotating relative to the indexing block when the shoulder is positioned within the receiver portion.

18. A method of providing a plurality of towing accessories for a vehicle without the need to completely remove a towing assembly from a hitch receiver comprising:
providing a rotating assembly that includes a multi-face block having a plurality of towing accessories and an engagement shaft extending axially from the multi-face block;
inserting the engagement shaft of the multi-face block into a channel of an indexing block; and
selectively attaching the indexing block to a hitch receiver of a vehicle;
wherein the rotating assembly includes a lock assembly having a bias member configured to cooperate with a coaxial plunger, thereby allowing for selective rotation of the multi-face block relative to the indexing block.

19. The method of claim 18 wherein the engagement shaft of the multi-face block includes at least one ball bearing that cooperates with the plunger, and a groove along an inner surface of the indexing block to facilitate movement of the plunger and multi-face block relative to the indexing block when the assembly is being rotated to position a new towing accessory in a desired place.

20. The method of claim 18 further comprising:
selectively placing the rotating assembly in a locked position to prevent translational movement between the multi-face block and the indexing block, wherein at least one ball bearing is moved into abutting engagement with a groove of the indexing block; and
selectively placing the rotating assembly in an unlocked position to allow translational movement between the multi-face block and the indexing block, wherein the at least one ball bearing is positioned within an indent of the plunger.

21. The method of claim 20 further comprising:
selectively placing the rotating assembly in a locked position to prevent rotational movement between the multi-face block and the indexing block, wherein a shoulder having a non-circular cross section is positioned within a receiver portion on the indexing block; and
selectively placing the rotating assembly in an unlocked position to allow rotational movement between the multi-face block and the indexing block, wherein said shoulder is translated from the receiver portion of the indexing block.

* * * * *